United States Patent [19]
Chmielewski et al.

[11] Patent Number: 5,479,215
[45] Date of Patent: Dec. 26, 1995

[54] CIRCUIT ARRANGEMENT FOR IMPROVING THE QUALITY OF A VIDEO SIGNAL BY ADDING A FILTERED VIDEO SIGNAL TO A DELAYED VIDEO SIGNAL AND BY USING A CORING STAGE FOR SUPPRESSING LOW LEVEL SIGNAL COMPONENTS

[75] Inventors: Ingo Chmielewski, Braunschweig; Detlef Raeth, Hohenhameln, both of Germany

[73] Assignee: MB Video GmbH, Peine, Germany

[21] Appl. No.: 250,784

[22] Filed: May 27, 1994

[30] Foreign Application Priority Data

May 29, 1993 [DE] Germany ............... 43 18 057.4

[51] Int. Cl.$^6$ ................................. H04N 5/20
[52] U.S. Cl. ................................. 348/627; 348/623
[58] Field of Search ............... 348/241, 242, 348/712, 674, 607, 618, 623, 627, 629; H04N 5/20, 5/205, 9/64, 5/14

[56] References Cited

U.S. PATENT DOCUMENTS

| | | | |
|---|---|---|---|
| 3,715,477 | 2/1973 | Olson et al. | 348/627 X |
| 4,414,564 | 11/1983 | Hitchcock | 348/674 X |
| 4,536,796 | 8/1985 | Harlan | 358/166 |
| 4,962,419 | 10/1990 | Hibbard et al. | 348/629 X |
| 4,962,426 | 10/1990 | Naoi et al. | 348/623 |

FOREIGN PATENT DOCUMENTS

| | | | |
|---|---|---|---|
| 3430933 | 3/1985 | Germany | H04N 5/20 |
| 3514219 | 10/1986 | Germany | H04N 5/20 |
| 2145601 | of 0000 | United Kingdom . | |

OTHER PUBLICATIONS

Lebowsky, "Hierarchical Image Quality Improvement Using Multiprocessor Systems", Television and Cinema Technology, pp. 155–164 (1992). no translation.

Primary Examiner—Victor R. Kostak
Assistant Examiner—John W. Miller
Attorney, Agent, or Firm—Foley & Lardner

[57] ABSTRACT

A circuit arrangement for improving the quality of video signals read out from a storage medium by isolating and processing a radio-frequency component which is added to a delayed video signal. An improvement can be achieved in particular in the signal details without any noise amplification effects and at the same time providing a natural picture. The circuit arrangement includes a synchronizing pulse separation stage for separating the radio-frequency component from the synchronizing pulses, a coring stage for suppressing signal components with signal values lying below a first threshold value and a controllable amplification stage, which influences the instantaneous signal value with a characteristic curve which is dependent on the signal value in a main signal branch and provides an increasing relative boosting of the radio-frequency component for greater signal values in the main signal branch.

14 Claims, 3 Drawing Sheets

CIRCUIT ARRANGEMENT FOR IMPROVING THE QUALITY OF A VIDEO SIGNAL BY ADDING A FILTERED VIDEO SIGNAL TO A DELAYED VIDEO SIGNAL AND BY USING A CORING STAGE FOR SUPPRESSING LOW LEVEL SIGNAL COMPONENTS

BACKGROUND OF THE INVENTION

The invention relates to a circuit arrangement for improving the quality of video signals read out from a storage medium by isolating a radio-frequency component, which is conditioned in a signal processing branch parallel to the main signal branch by using a coring stage for suppressing signal components with signal values lying below a first threshold value and which is added to the delayed video signal of the main signal branch.

It is known that the picture quality of conventional VHS and S-VHS recorders is inferior to that of normal video signals. This applies in particular with regard to picture details which are of significance in particular in the luminance signals.

It is known that the picture quality can be improved by establishing a correlation between neighboring signal values (pixels). In principle, this involves conditioning a radio-frequency component of the video signal, for example, of the luminance signal, in a signal processing branch parallel to the main signal branch by limiting and weighting, and then adding it again to the delayed video signal in the main signal branch. One method known to accomplish picture quality enhancement is to divide the luminance signal over two parallel processing branches, a low-pass filter being arranged in one processing branch and a band-pass filter for radio-frequency signal components being arranged in the other processing branch. The band-pass filter is followed downstream by an amplifier and a threshold stage, by which the radio-frequency signal components which are allowed through by the band-pass filter of which the amplitudes below the threshold switching are suppressed. The signal is "decored" of the low amplitude values (coring technique), as a result of which a noise reduction is attained. The signal components of the two processing branches are combined again by addition.

In digital technology, the formation of the radio-frequency component can be performed by the video signal being delayed by one pixel, one line or one frame and the delayed signal being subtracted from the undelayed signal. In this way, the relation with respect to the neighboring signal values is established. A radio-frequency signal which can be further processed is produced only if the neighboring, delayed signal value is changed with respect to the undelayed signal value. By this technique it is possible to amplify worn signal details and thus achieve an improvement in the picture quality with regard to the signal details. It is likewise known from Lebowsky, "Hierarchische Bildqualitätsverbesserung mit Multiprozessorsystemen" (Hierarchical Picture Quality Improvement with Multiprocessor Systems), Fernseh- und Kino-Technik (Television and Cinema Technology) 1992, pages 155 to 164, incorporated herein by reference, to filter out from the luminance signal a detail signal by a two-dimensional high-pass filter and feed it to a coring stage, which suppresses low amplitudes of the filtered-out signal and linearly amplifies amplitudes lying above a threshold value. Owing to established disadvantages of this method, a gradient-oriented method with a filter bank with anisotropic filters of differing orientation has also been utilized. This method, like the method described above, has advantages and disadvantages.

SUMMARY OF THE INVENTION

A hierarchial picture definition improvement to specifically utilize (with or without conventional microprocessor techniques) the advantages of the known methods per se, including linear aperture correction, coring technique and gradient-oriented method, is proposed.

The major disadvantage of the previously used signal conditioning stages using the coring technique often lead to an unnatural picture impression, which results from the improvement in the signal details, in particular the edge definition.

The invention is based on the object of improving a circuit arrangement for the quality improvement of video signals of the types mentioned earlier in a simple way, so that in particular a more natural picture impression is produced.

This object is achieved according to the invention by a circuit arrangement of the type mentioned at the beginning wherein there are arranged in the parallel signal processing branch for the radio-frequency component a synchronizing pulse separation stage for freeing the radio frequency component from the synchronizing pulses, the coring stage and a controllable amplification stage, which influences the instantaneous signal value with a characteristic curve which is dependent on the signal value in the main signal branch and provides an increasing relative boosting of the radio-frequency component for greater signal values in the main signal branch.

According to the invention, the radio-frequency components at the output of a high-pass filter in the parallel signal processing branch are selected according to whether the signal values exceed or fall below a first threshold value. If the signal values fall below the first threshold value, they are not allowed through the coring stage, that is to say they are suppressed. This measure is based on the realization that radio-frequency signal components with a low amplitude do not contribute anything to video signal improvement, on the contrary they are usually produced by noise. The coring stage used according to the invention therefore serves for noise suppression. The radio-frequency signal thus conditioned is subsequently applied to an amplifier with a characteristic curve, in which the characteristic curve is dependent on the signal value of the video signal in the main signal branch. The weighting function thereby attained utilizes the realization that, on account of human perception characteristics, a significantly greater improvement in detail (for example edge definition) is desirable for bright picture signals (picture signals with a large signal value) than in the case of dark signals (correspondingly small signal values).

The circuit arrangement according to the invention therefore leads to a different improvement in detail for bright signals and dark signals, the amplification of noise signals being avoided to a great extent. The characteristic curve for the weighting of the conditioned radio-frequency signal provides an increasing relative boosting for greater signal values in the main signal branch. In a preferred exemplary embodiment, the characteristic curve rises from a multiplication factor of some fraction of 1 for low signal values to about 1 in the case of maximum signal values. The shape of the characteristic curve is preferably adapted to the characteristics of the human eye.

For a natural picture impression it is advantageous that in the coring stage signal components with a signal value lying between the first threshold value and a second threshold value, where the second threshold value is greater than the first, are passed through the coring stage proportionally to their signal value, and signal components with a signal value lying above the second threshold value are passed through with an upwardly limited value. The maximum amplitude of radio-frequency components processed in the parallel signal processing branch is consequently limited, so that unnaturally amplified signal jumps are moderated. The limitation of the signal value is in this case preferably to a predetermined constant value.

A particularly effective improvement in the signal quality is achieved if a vertical radio-frequency component and a horizontal radio-frequency component are formed in the parallel signal processing branch, that is to say the correlation with neighboring signal values is taken into consideration both in the horizontal direction and in the vertical direction. In this case, the vertical and horizontal frequency components formed are processed by one coring stage each and are then brought together again.

By the parallel processing of a vertical radio-frequency component and a horizontal radio-frequency component, it is possible to amplify the vertical radio-frequency component and the horizontal radio-frequency component to different degrees. This can be achieved, for example, by setting different proportionality factors of their respective coring stages. In a preferred exemplary embodiment, the rise in the proportional section of the coring stage for the vertical resolution is 2 and for the horizontal resolution is 1. This makes it possible to improve again the vertical resolution, reduced in comparison with the horizontal resolution for example when noise suppression methods are used.

To avoid an overshooting or undershooting condition, often occurring in the case of compensation techniques, there is preferably arranged downstream of the coring stage an addition stage, by which the radio-frequency component in the video signal is added in the main signal branch, a correction stage which performs a comparison of the video signal before and after the addition of the radio-frequency component and, in the event that a limit value for the difference between the two signals is exceeded, performs a signal value limitation. The limit value used in this case may expediently be variable depending on the signal value of the video signal, so that for example a change in the video signal in the main signal branch of ±10% of the signal value in the parallel signal branch is permitted. This measure likewise contributes to enhancing the naturalness of the impression of the improved video signal.

BRIEF DESCRIPTION OF THE DRAWINGS

The features of the present invention are set forth with particularity in the appended claims. The invention, together with further objects and advantages thereof, may best be understood by making reference to the following description taken in conjunction with the accompanying drawings, in the several figures in which like reference numerals identify like elements, and wherein:

DETAILED DESCRIPTION OF THE PREFERRED EMBODIMENTS

Figure 1:
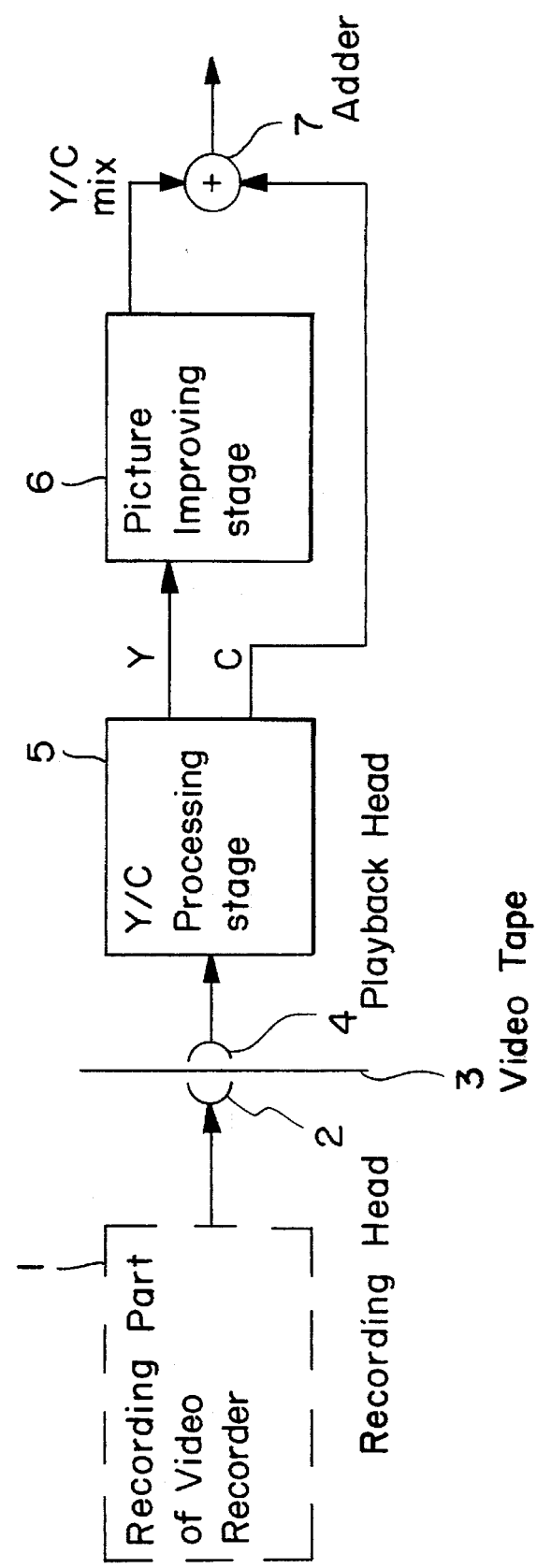
FIG. 1 shows a block diagram for explaining the use of the signal improvement according to the invention.

FIG. 1 shows diagrammatically and in a dashed-line representation a recording part 1 of a video recorder, by which video signals are applied in the known way by a recording head 2 onto a video tape 3.

The recorder video signals can be picked up from the tape by a playback head 4 and processed in a Y/C processing stage 5 and divided into a luminance signal Y and at least one chrominance signal C. In accordance with the invention, luminance signal Y passes to a picture improving stage 6 and is subsequently fed together with the unprocessed chrominance signal C to an adder 6 for the forming of a customary composite video signal, which can be reproduced by a customary television receiver.

Figure 2:
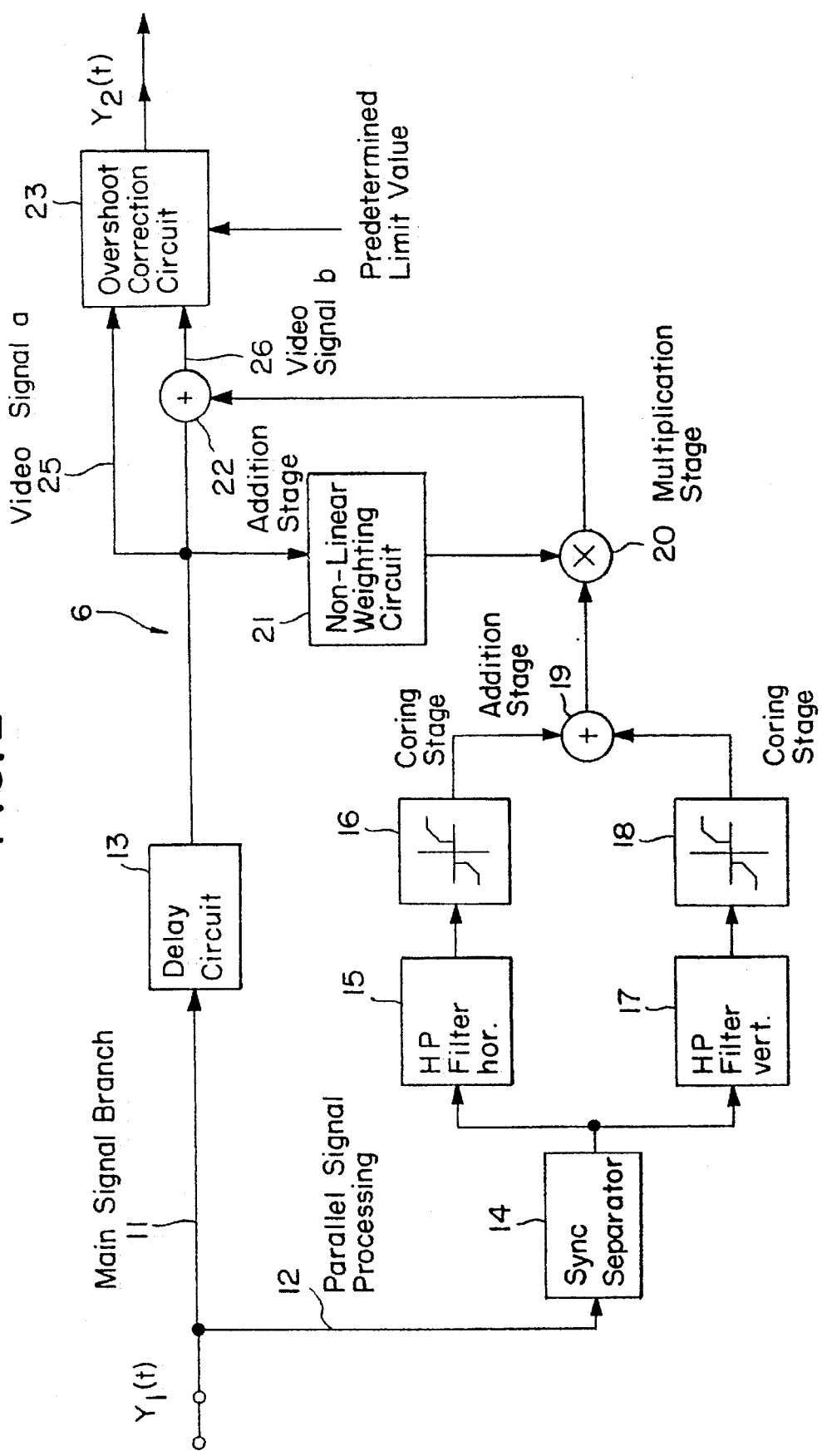
FIG. 2 shows a signal improvement circuit arrangement for a luminance signal.

FIG. 2 shows an exemplary embodiment of a picture improving stage 6 for a luminance signal $Y_1$ (t). The luminance signal passes both into a main signal branch 11 and into a parallel signal processing branch 12. In the main signal branch 11, the luminance signal $Y_1$ (t) is delayed essentially by a delay circuit 13.

In the parallel signal processing branch 12, the luminance signal $Y_1$ (t) passes through a synchronizing pulse separation stage 14, by which the synchronizing pulses are removed from the luminance signal $Y_1$ (t). Connected to the output of the synchronizing pulse separation stage 14 in a parallel connection are a horizontal high-pass filter 15 with a downstream coring stage 16 on the one hand and a vertical high-pass filter 17 with a downstream coring stage 18 on the other hand. The outputs of the two coring stages 16, 18 are brought together in an addition stage 19.

The horizontal high-pass filter 15 is, for example, an FIR filter, which passes radio-frequency changes in horizontally neighboring signal values. The following coring stage 16 suppresses all the signal values which are at the output of the horizontal high-pass filter 15 and lie below a first threshold value. Signal values between the first threshold value and a second threshold value, lying above the first, are allowed through virtually unchanged, while signal values lying above the second threshold value are limited to a predetermined value. The coring stages 16, 18 serve for a distinct suppression of noise and interference in the region of signal details.

Figure 3:
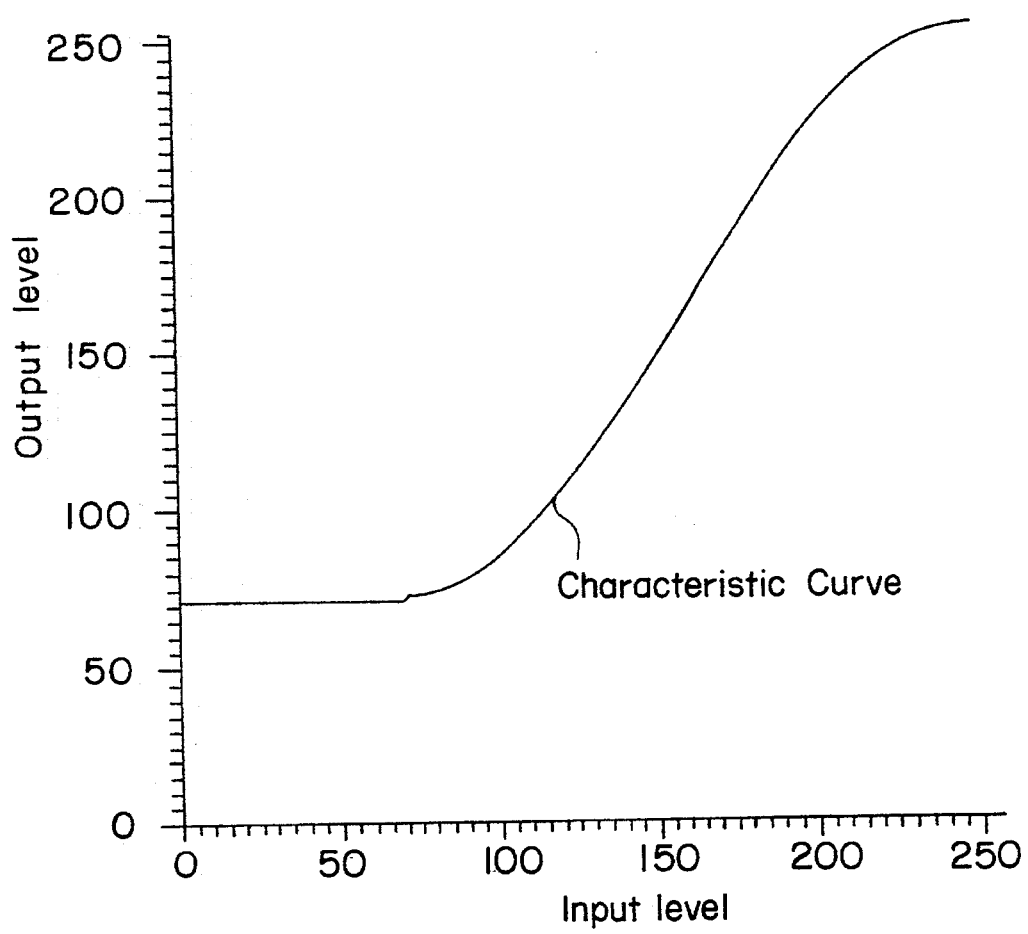
FIG. 3 shows a characteristic curve for the non-linear weight of the radio-frequency signal components.

The signal components brought together in the addition stage 19 pass to a multiplication stage 20, the multiplication factor of which is controlled by a non-linear weighting circuit 21. The non-linear weighting circuit 21 sets the multiplication factor of the multiplication stage 20 in dependence on the instantaneous signal value in the main signal branch 11. An example of a characteristic curve caused by the non-linear weighting stage 21 for the multiplication stage 20 is represented in FIG. 3. It can be seen that, for small input signal values, which essentially correspond to dark video signals, a multiplication factor (with respect to the maximum input level of 250) of 0.2 to 0.3 is set, which rises essentially linearly, for example as for small angles sinusoidally, when the input signal value lies between 40 and 80% of the maximum signal value, and asymptotically approaches the multiplication factor 1 when the input signal value tends towards the maximum signal value. The characteristic curve 24 represented in FIG. 3 is adapted to the perception characteristics of the human eye.

Therefore, signal details for bright signal values are passed on with a significantly higher multiplication factor than signal details for relatively dark video signals by the multiplication stage controlled with such a characteristic curve 24 by the non-linear weighting circuit 21.

The signal available at the output of the multiplication stage 20 is added to the video signal in the main signal branch 11 by means of an addition stage 22.

For the prevention of overshoot effects, the addition stage 22 is followed downstream by an overshoot correction circuit 23, to one input of which is fed the video signal a on line 25 upstream of the addition stage 22 and to the other input of which is fed the video signal b on line 26 downstream of the addition stage 22. If the difference between the amplitude of the video signals (a–b), in absolute value, lies below a predetermined limit value, no correction takes place. If, however, this limit value is exceeded, the video signal b is reduced such that the deviation from the video signal a corresponds to the predetermined limit value 27.

The predetermined limit value is entered as a maximum overshoot into the overshoot correction circuit 23 and may be referred to the size of the signal value of the video signal a, for example the limit value can be assigned to be 10% of the signal value a. An overshoot limitation therefore commences earlier for small signal values than for high signal values.

The result of the quality improvement circuit according to the invention surpasses the results which can be attained with conventional quality improvement circuits, in particular due to the combination of the attainable improvements in detail with the reduction in noise effects and the retention of a natural impression adapted to human visual perception.

What is claimed is:

1. A method for improving quality of a video signal read out from a storage medium, said method comprising the steps of:

inputting said video signal from said storage medium onto a main signal branch and a parallel signal branch;

delaying said video signal on said main signal branch to obtain a delayed video signal;

separating synchronization pulses contained within said video signal on said parallel signal branch to obtain a sync-free video signal;

filtering said sync-free video signal to obtain radio-frequency components of said video signal on said parallel signal branch;

applying said radio-frequency components to a coring stage to suppress radio-frequency components lying below a first threshold value and to obtain filtered radio-frequency components on said parallel signal branch;

amplifying said filtered radio-frequency components to obtain amplified radio-frequency components, wherein the level of amplifying is set according to the amplitude of said delayed video signal in said main signal branch; and adding said amplified radio-frequency components to said delayed video signal to obtain an improved output video signal.

2. The method as claimed in claim 1, wherein said amplifying is based on an input amplitude versus output amplitude characteristic curve, and wherein said characteristic curve provides an increasing amplification of said filtered radio-frequency components for an increasing amplitude of said delayed video signal over at least a portion of a range of values for said input amplitude.

3. An apparatus for improving quality of a video signal read out from a storage medium, said apparatus comprising:

a video signal input connected to receive said video signal from said storage medium;

a delay circuit connected to receive said video signal from said video signal input and configured to output a delayed video signal;

a synchronization separator circuit connected to said video signal input to receive said video signal from said video signal input and configured to remove synchronization pulses from said video signal to generate a sync-free video signal;

a high-pass filter connected to said synchronization separator circuit to receive said sync-free video signal and configured to remove low frequency components of said sync-free video signal to generate radio-frequency components of said sync-free video signal;

a coring stage connected to said high-pass filter to receive said radio-frequency components from said high-pass filter and configured to suppress radio-frequency components lying below a first threshold value to generate filtered radio-frequency components;

an amplifier connected to said coring stage to receive said filtered radio-frequency components from said coring stage and configured to amplify said filtered radio-frequency component according to an amplitude of said delayed video signal to generate amplified radio-frequency components; and an adder connected to said amplifier and said delay circuit and configured to add said delayed video signal to said amplified radio-frequency components to obtain an improved video signal.

4. An apparatus as claimed in claim 3, wherein an input amplitude versus output amplitude characteristic curve of said amplifier provides an increasing amplification of said filtered radio-frequency components for an increasing amplitude of said delayed video signal.

5. An apparatus as claimed in claim 3, wherein an input amplitude of said radio-frequency components fed to said coring stage and lying between a first threshold value and a second threshold value are passed through said coring stage to obtain said filtered radio-frequency components having an output amplitude proportional to said input amplitude, and wherein an input amplitude to said coring stage lying above said second threshold are allowed to pass through said coring stage with a fixed output amplitude and wherein an input amplitude less than said first threshold is blocked from being output by said coring stage.

6. An apparatus as claimed in claim 3, wherein:

said high-pass filter comprises a vertical high-pass filter in parallel with a horizontal high-pass filter, and wherein said vertical high-pass filter and said horizontal high-pass filter receive said sync-free video signal as input thereto, and wherein said vertical high-pass filter outputs vertical-radio-frequency components, and wherein said horizontal high-pass filter outputs horizontal-radio-frequency components;

said coring stage comprises a first coring filter connected to said horizontal high-pass filter and a second coring filter connected to said vertical high-pass filter, wherein said first coring filter receives said horizontal-radio-frequency components as input thereto and outputs filtered-horizontal components and wherein said second coring filter receives said vertical-radio-frequency components as input thereto and outputs filtered-vertical components; and an adder connected to said coring stage, wherein said adder adds said filtered-vertical components and said filtered-horizontal components to obtain composite-filtered components, and wherein said composite-filtered components are input to said amplifier.

7. The apparatus as claimed in claim 3, which comprises a correction stage connected to said adder, wherein said correction stage compares said delayed video signal to said improved video signal, and if said delayed video signal differs from said improved video signal by a predetermined amount, said correction stage performs a signal value limitation on said improved video signal.

8. The apparatus as claimed in claim 7, wherein said predetermined amount is a variable depending on said amplitude of said video signal.

9. An apparatus for improving quality of a video signal read out from a storage medium, said apparatus comprising:
  a video signal input connected to said storage medium and configured to receive said video signal from said storage medium;
  means, connected to said video signal input, for delaying said video signal input and for outputting a delayed video signal;
  synchronization means connected to said video signal input for receiving said video signal from said video signal input and for removing synchronization pulses from said video signal to generate a sync-free video signal;
  filtering means connected to said synchronization means for receiving said sync-free video signal and for removing low frequency components of said sync-free video signal to generate radio-frequency components of said sync-free video signal;
  noise suppression means connected to said filtering means for receiving said radio-frequency components from said filtering means and for suppressing radio-frequency components lying below a first threshold value to create filtered radio-frequency components;
  amplification means connected to said noise suppression means for receiving said filtered radio-frequency components from said noise suppression means and for amplifying said filtered radio-frequency components according to an amplitude of said delayed video signal for producing an amplified radio-frequency components; and
  adding means connected to said amplification means and said delaying means for adding said delayed video signal to said amplified radio-frequency components to obtain an improved video signal.

10. An apparatus as claimed in claim 9, wherein an input amplitude versus output amplitude characteristic curve of said amplification means provides an increasing amplification of said filtered radio-frequency components for an increasing amplitude of said delayed video signal.

11. The apparatus as claimed in claim 10, wherein said characteristic curve varies from a multiplication factor of a fraction of one for small signal input values up to a multiplication factor of approximately one for large signal input values.

12. An apparatus as claimed in claim 9, wherein:
  said filtering means comprises a vertical high-pass filter in parallel with a horizontal high-pass filter, and wherein said vertical high-pass filter and said horizontal high-pass filter receive said sync-free video signal as input thereto, and wherein said vertical high-pass filter outputs vertical-radio-frequency components, and wherein said horizontal high-pass filter outputs horizontal-radio-frequency components;
  said noise compression means comprises a first coring filter connected to said horizontal high-pass filter and a second coring filter connected to said vertical high-pass filter, wherein said first coring filter receives said horizontal-radio-frequency components as input and outputs filtered-horizontal components and wherein said second coring filter receives said vertical-radio-frequency components as input and outputs filtered-vertical components; and
  an adder connected to said noise suppression means, wherein said adder adds said filtered-vertical components and said filtered-horizontal components to obtain composite-filtered components, and wherein said composite-filtered components are input to said amplification means.

13. The apparatus as claimed in claim 12, wherein said horizontal-radio-frequency component and said vertical-radio-frequency component are amplified to different degrees, and wherein said different degrees of amplification are produced by different proportionality factors of said first coring filter and said second coring filter.

14. The apparatus as claimed in claim 13, wherein amplification of said vertical-radio-frequency components is set greater than amplification of said horizontal-radio-frequency components.

* * * * *